United States Patent Office 3,334,352
Patented Aug. 1, 1967

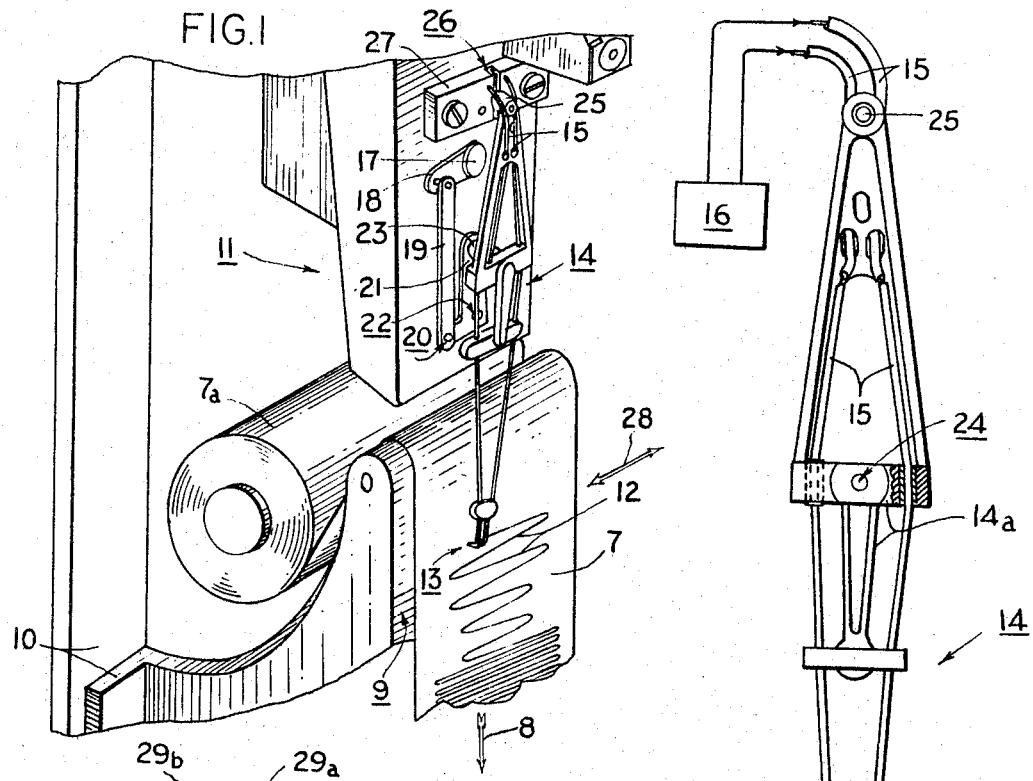

3,334,352
THERMAL RECORDING
Cosmo Abbondante, Burlington, and Albion P. Bjork, Bedford, Mass., assignors to BLH Electronics, Inc., Waltham, Mass., a corporation of Delaware
Filed Mar. 18, 1965, Ser. No. 440,810
6 Claims. (Cl. 346—76)

ABSTRACT OF THE DISCLOSURE

An oscillographic recorder, having a motor-driven chart of heat-sensitive paper and an electrically-actuated armature driving a stylus holder, is equipped with a stylus at the end of which a Peltier-effect thermoelectric junction is formed between dissimilar materials, and an electrical power source continuously forces current through the junction to operate it only in a heat-emitting mode wherein it continuously emits localized heat and develops temperatures at the stylus end which will produce visible records on the chart.

---

The present invention relates to improvements in thermally-induced recording of intelligence, and, in one particular aspect, to novel and improved high-efficiency oscillographic recorder apparatus in which a unique junction-type writing stylus is energized with relatively low power to emit heat concentrated at a minute wiring point and to produce sharply-defined legible traces over a wide range of writing speeds.

As is well known, devices for recording intelligence have been based upon a number of different phenomena which will effect permanent traces or writings of information; by way of example, photographic, inking, and thermal techniques have been exploited for such purposes. In one highly useful class of such devices, a circular or strip chart of paper or the like is driven in relation to a dynamically-operated stylus which is capable of leaving a visible marking of its excursions relative to the chart; the stylus, generally having either an ink-dispersing pen or a nib formed of resistance heater wire, is conventionally moved arcuately or rectilinearly by the movable armature of a motive device which responds to excitation signals characterizing a measured condition such as pressure, temperature, current, and so forth. For many applications, the use of an inking pen is undesirable because of clogging, puddling, staining, spillage, and the need for replenishing the ink supply, and a heated stylus cooperating with a thermally-responsive chart obviates these difficulties. However, the usual pointed stylus of resistance wire tends to be seriously inefficient, insofar as its localizing of heat at the desired writing point is concerned, and, moreover, it demands relatively high operating power, and involves risks of overheating, with consequent scorching of or excessively wide writing on a record, unless the excitation power is carefully regulated for its different operating conditions. Some promise for improvement has been offered by prior proposals to reduce the resistance-wire cross-section, and thereby raise the heating, only near the writing site; however this technique does not lend itself to the fabrication of stylus points which are both rugged and sharp. Another proposal, intended to squelch heating at times when marking would be undesirable, has involved cooling in accordance with the Peltier effect; however, the excitation currents must be alternated for such devices, in synchronism with those discrete times when heating and cooling effects are required. In accordance with the present teachings, the aforesaid disadvantages are uniquely and successfully overcome in heated-stylus apparatus wherein heat-emitting mode Peltier effects are relied upon to develop sharply-concentrated heating effects alone, with significantly lowered power and extraneous thermal losses, with desirable sensitivity to variations in temperature at a junction, and with improved high-speed writing capabilities which are of particular advantage in oscillographic recorder applications.

It is one of the objects of the present invention, therefore, to provide novel and improved thermal recording apparatus of low-cost construction which operates with high thermal and electrical efficiencies to develop legible records at high writing speeds.

Another object is to provide high-speed oscillographic recorder apparatus including a fine-writing stylus which is continuously excited to emit and concentrate heat at a minute thermoelectric junction of dissimilar materials and which reduces undesirable effects of convection, conduction and radiation of heat.

A further object is to uniquely excite a junction of dissimilar materials at the tip of a recording sylus in the Peltier heat-emitting mode and to localize heat generated by thermoelectric effects for highly efficient writing purposes while minimizing power losses due to resistance-heating effects.

Still further, it is an object to provide low-power, high-efficiency, and high-speed thermal recording in which predominantly thermoelectric effects develop heat concentrations at substantially one point and promote fine legible writing upon a heat-sensitive medium without undue risk of burning or loss of efficient writing capability and with desirable sensitivity to variations in temperature at the point.

By way of a summary account of practice of this invention in one of its aspects, a recorder of the type including a motor-driven chart of heat-sensitive paper and an electrodynamically-actuated armature for oscillating a stylus holder is equipped with a V-shaped pointed stylus unit formed by a pair of short dissimilar metal wires, such as those of chromel and alumel, which are resistance-welded together at a single minute point of overlapping contact and are shaped to expose material at the interface of a junction thus formed at a relatively sharp end serving as a writing nib. The dissimilar wires are continuously energized, serially, by a source of unidirectional electrical current which forces current through the stylus in a direction which predominantly causes heat to be emitted locally at the junction throughout a recording interval during which the armature may respond to the input signals which are to be recorded.

The subject matter regarded as our invention is particularly pointed out and distinctly claimed in the concluding portion of this specification. However, both as to preferred practices and structure, and further in relation to objects and advantages thereof, this invention may best be understood through reference to the following description taken in connection with the accompanying drawings, wherein:

FIGURE 1 pictorially illustrates a portion of a high-speed strip-chart oscillographic recorder including a dynamically-actuated heated stylus;

FIGURE 2 is a plan view of a heated stylus and holder assembly, together with a block-diagrammed excitation source;

FIGURE 3 views the same stylus and a portion of the holder from the right of its orientation in FIGURE 2;

FIGURE 4 provides an end view, from the front, of dissimilar wires crossed to form a single-point thermoelectric junction in a stylus such as that depicted in FIGURES 1–3;

FIGURE 5 portrays an improved junction-type stylus, viewed from the front, having its shaped writing point in association with a record medium; and FIGURES 6A through 6D are reproductions of traces produced by the improved stylus under different operating and excitation conditions.

The apparatus represented in FIGURE 1 includes a number of features which will be recognized as generally-conventional counterparts of those commonly used in oscillographic recorders. The recording medium 7 is shown in a strip-chart configuration, being withdrawn from a supply roll 7a and moved at selectable speeds in the direction of arrow 8 across a back-up platen surface 9 by suitable motive means (not illustrated). In addition to these elements, the framework or base structure 10 also supports a pen-motor, motion-conversion, and stylus assembly, 11, which serves to characterize the electrical input signals applied to the recorder in terms of a substantially permanent visible record or trace, 12, on the chart 7. For the latter purposes, the unique nib or writing end 13 of the movable stylus unit 14 is electrically energized, via leads 15, from an electrical power source 16 (FIGURE 2) and advantageously emits highly localized heat which will evoke a distinctive sharply-defined visible marking on the heat-sensitive medium 7 at each point of its contact with that medium. Thermally-sensitive record materials which will respond in the desired manner to yield heat-induced markings are of course well known in the art, and therefore require no detailed discussion here, although it is noted that some of these develop molten material at the surface (for example, wax-type materials), which usefully minimizes the coefficient of friction between the relatively movable pen and paper.

In a generally-conventional manner, the electrical input signals which are monitored and translated into permanent records by the recorder apparatus are translated into related angular movements of the armature shaft 17 of a pen motor (other details not visible in the illustrations); in turn, these movements are amplified by a lever arm 18 which is pivotally connected with a floating link 19 having further a pivotal connection, at 20, with an L-shaped rocker arm 21, the latter being pivoted at 22 for angular movements about an axis fixed in relation to the framework 10. End 23 of the rocker arm is pivotally pinned with the stylus frame 14a by way of the bore 24 (FIGURE 2) and thus tends to induce angular movements of the stylus about its end pivot 25; however, that end pivot is slidable in the narrow slot 26 of a stationary guide and pivot block 27, and also undergoes certain reciprocating movements in the directions of the slot. In accordance with well established design techniques, this rotary-to-rectilinear motion-conversion mechanism is proportioned and arranged to develop substantially linear reciprocating excursions of stylus nib 13, in directions 28 transverse to the direction 8 of strip-chart movement; the extents of these motions are in a predetermined relationship to the angular movements of the pen-motor armature.

Electrically-heated writing nib 13 is fashioned from two dissimilar metal wire elements 13a and 13b, which are integrated with one another by a spot-welded junction appearing at the very tip, 13c, of the V-shaped nib, as appears in FIGURES 2, 3 and 5. Mechanical support, spring-biasing, and electrical excitation functions are served by the two elongated stylus leads 29a and 29b, which are connected with different ones of power leads 15 and project about the same distance from stylus frame 14a; insulating spacer 30 preserves the nib ends of the stylus leads in a predetermined closely-spaced relationship. Typically, the stylus leads 29a and 29b may be of a beryllium-copper alloy which will offer desirably low electrical resistance and exhibit a useful springiness when appropriately heat-treated. The dissimilar metals of which the nib elements 13a and 13b are formed are those which are known to develop a substantial Peltier effect; by way of example, such metals may include Chromel and Alumel for the elements 13a and 13b, respectively, or, in another version, platinum and a platinum-rhodium alloy. This junction effect is a rather commonly exploited one, and its attraction ordinarily lies in its heat-absorption, or cooling, capabilities which are developed when electrical current occurs in one direction through the junction. There is a reciprocal aspect to the Peltier cooling phenomenon, however, which has to do with the emission of heat by a like junction when the current through it is in the reversed direction. The electrical generation of heat is readily attained using relatively simple low-cost resistance elements, of course, and one is thus not naturally led to consider the Peltier junction solely as a desirable heat source (although it has been proposed for alternate heating and cooling where both such results were needed anyway). It has nevertheless been discovered that dissimilar-material thermoelectric junctions, operated only in the heat-emitting mode, and constructed to concentrate emissions at a highly-localized and isolated minute point, yield such significantly improved operating characteristics in thermal recording that the increased costs and complexities in forming a writing junction, rather than a simple resistive element are far outweighed. In this connection, it should be recognized that in prior heated-stylus recorders, relying upon the $I^2R$ heating losses in a simple resistive member as the source of thermal writing energy, it has been difficult to concentrate and regulate heat. Small-size heater wires are obviously highly susceptible to mechanical failure, and, on the other hand, thicker wires tend to require excessive exciting currents and more massive conductors, and to spread the resulting heat over large areas which preclude the possibility of fine and sharp writing and necessarily increase the amount and quality of thermal insulation which must be used in the movable stylus structure. Because of the extensive cooling which occurs in relatively large resistive heaters as they are moved rapidly during high-speed tracing, more writing current is needed than at times when they are moved slowly. Unfortunately, when the current is once adjusted for satisfactory recording at high speeds and the writing speed is subsequently changed, the aforesaid cooling diminishes and the resistance-type stylus may so increase in temperature as to reach a glowing red state and occasion risks of wide-writing, burning of the chart, and wiring burn-out.

A preferred embodiment of the improved stylus construction involves a single minute dissimilar-metal junction having interface material exposed directly at the writing point and involving dissimilar-metal wires which do not experience the same high $I^2R$ losses needed for adequate heating of a purely resistive stylus wire. This improved construction so narrowly concentrates the generated heat at the junction and writing point that adequate thermal energy is available for writing even though the nearby dissimilar wires do not also become intensely heated. The latter factor is important inasmuch as these lower-temperature wires then do not tend to cool as much due to convection and radiation effects occurring during high-speed movements, and a heating rate which is adjusted to an optimum for high-speed writing is thus not vastly different from that which is satisfactory for lower-speed writing. Accordingly, a given supply of electrical power will permit efficient writing over a broad range of speeds, without involving objectionably wide marking and burning hazards at low speeds. There is a further beneficial self-regulating aspect of the improved junction-type stylus, associated with the fact that the heating rate in the junction varies with the heating-mode current through it, and with the temperature of that junction. When the junction is lowered in temperature, as is the case for high-speed writing conditions, and when the junction is fed from a low-impedance source of power, the thermoelectric voltage in the thermocouple junction is decreased. Because the thermoelectric voltage is of a sense which opposes the supply voltage which forces the current through the junction, current is increased and thereby increases the heating rate, as desired. The effects are of opposite sense for low-speed writing conditions, and thus the advantageous tendency is toward reduction of the heating rate. In comparisons made between operations of an ordinary resistance-wire stylus and one involving the improved thermocouple junction, each was heated by passing about four amperes of current through it, and a block of heat-conducting metal was brought into contact with its tip. Current through the resistance-wire stylus remained substantially constant, while that through the junction-type stylus increased by about five percent. Although the tip of the resistive stylus was subjected to some cooling in this process, the net effect on its total resistance remained very small and no regulatory current change was observed, whereas the resulting changes (decrease) in thermoelectric voltage at the junction tip of the improved stylus caused the heating current to increase and thereby elevate the junction temperature to substantially its original temperature. This phenomenon desirably renders the writing quality of the junction-type stylus less dependent upon adjustments of the heating currents for different writing speeds. The high efficiencies realized with the new stylus result in lesser power for high-quality writing, it being found that only about one-fourth of the power required for resistive units is needed; in addition, there is a lessened likelihood of burn-out of the stylus when lower power is involved.

Inasmuch as the heat generated for writing is to be concentrated at one small site at the very tip of the stylus, it is desirable that the heat-emitting junction comprise a single small spot weld and that the material of part of this weld be directly exposed to the writing surface. FIGURE 4 characterizes a fabrication technique which advantageously satisfies these requirements. There, one of the dissimilar-metal wire elements 13b is crossed with the other, 13a, to form the intended angle between the legs of the V-shaped stylus, and a single small-area resistance welded spot 13c' is created at the point of contact between the elements. Thereafter, the unwanted portions of the wire elements extending beyond the junction 13c' are cut away, generally along the path 31 which intercepts the junction 13c'; an optical magnifier aids in determining when the cut is properly made into the junction site. A desired rounded configuration for the tip is then prepared in an abrasive polishing step; preferably, the radius for this rounding is less than about twenty thousandths of an inch. Generally circular cross-sections are preferred for the dissimilar-metal wires 13a and 13b, such that only one minute point of contact is realized when they are crossed for welding. In one satisfactory construction, these wires are about thirteen thousandths of an inch in diameter, and their junction-bearing tip is rounded with a radius of about the same value. The bent legs of elements 13a and 13b, remote from their junction, are spot-welded or otherwise mechanically and electrically secured to the ends of the resilient leads 29a and 29b.

FIGURES 6A–6D represent traces obtained with an improved junction stylus of the type illustrated in the apparatus of FIGURES 1 and 2 and fabricated in the manner explained above. When operated in the heating mode, carrying a "forward" unidirectional current of 2.5 amps, the stylus produced a clearly visible and sharp trace 32 (FIGURE 6A) on a thermally-sensitive record medium, 7, of the type having a dark coating, on a base, which is exposed when a superpositioned light coating having waxy characteristics is well heated by the stylus tip. Reversal of direction of this same level of current yielded a barely-discernible trace 33 (FIGURE 6B), because of the Peltier cooling effects developed in this incorrect mode of operation. In other comparable tests (not illustrated), a "forward" current of about 2 amps, in the heating mode, produced a fine and sharp trace, whereas operation with a "reverse" current of the same amount yielded substantially no visible trace. A "forward" or heating-mode current of 5.5 amps developed a somewhat broadened trace 34 (FIGURE 6C) which was not nearly as gross and wide as would be expected with a resistance-type stylus at that current and without mechanical oscillation; moreover, the junction-type stylus did not glow, as would have been expected with a resistance-type unit. The trace 35 in FIGURE 6D was obtained with the same (5.5 amps) current while the stylus was actuated by a 40-cycle excitation signal applied to the pen motor and developed a peak-to-peak trace amplitude of about one centimeter; under these conditions, the trace proved to be clear and narrow. The desired localized thermoelectric heating effects may of course be realized using dissimilar-material elements which are not "metals" in the classical sense, such as certain semiconductor materials which are known to yield Peltier-junction phenomena.

The foregoing examples, structures and practices have been presented by way of disclosure, rather than limitation, and it should be evident that various modifications, substitutions and combinations may be effected within the purview and on the basis of the present teachings without departing from the spirit and scope of this invention as set forth in the appended claims.

What we claim as new and desire to secure by Letters Patent of the United States is:

1. Recorder apparatus or the like of the type which utilizes a thermally-responsive record medium to provide visible records upon exposure to temperatures above a predetermined level, comprising pen means including a relatively small-area thermoelectric junction between dissimilar-material elements, means for maintaining the material of said junction in a heat-exchanging writing relationship with the record medium, an electrical power source including means for continuously forcing through said junction current energizing said junction in a heat-emitting mode wherein it continuously emits heat and develops temperatures above said predetermined level at said junction, and means for moving said pen means and the record medium in relation to one another simultaneously with operation of the current-forcing means to produce continuously the heat-emitting effects and temperatures above said level.

2. Recorder apparatus or the like of the type which utilizes a thermally-responsive record medium to produce visible records upon exposure to temperatures above a predetermined level, comprising pen means including a stylus formed by a pair of series-connected dissimilar-material elements having a single relatively small-area thermoelectric junction therebetween at a predetermined site, means for positioning the record medium and said stylus in a contacting relationship with one another wherein said junction is directly exposed to and in contact with the record medium, means for continuously forcing unidirectional current through said elements in the one of two possible directions which develops predominantly heat-emitting effects and temperatures above said predetermined level at said junction site, and means for moving said stylus and the record medium in relation to one another responsive to excitation signals applied to the apparatus simultaneously with operation of said means for continuously forcing unidirectional current, whereby heating effects produced by said stylus are concentrated at said site and produce continuous visible records on the thermally-responsive record medium.

3. Recorder apparatus or the like of the type which utilizes a thermally-responsive record medium to provide visible records, comprising pen means including a substantially V-shaped stylus formed by a pair of series-connected dissimilar-material elements having a single relatively small-area spot weld forming a thermoelectric junction therebetween at the tip of said stylus, said tip of said stylus being rounded and having an external surface including surfaces of said weld, said pen means further including a pair of elongated spaced resilient leads each connected at one end with a different one of said V-shaped stylus elements, means for positoining the record medium and said stylus in a contacting relationship with one another wherein said junction is directly exposed to and in contact with the record medium, means for continuously forcing unidirectional current through said elements in the one of the two possible directions which develops predominantly heat-emitting effects at said junction, said leads resiliently urging said tip of said stylus into contact with the record medium and conducting said unidirectional current through said elements from said current-forcing means, and pen motor means for moving said stylus relative to the record medium in response to electrical excitation signals applied thereto, whereby heating effects produced by said stylus are concentrated at said tip thereof.

4. In a recorder or the like of the type having a thermally-responsive record medium which produces substantially permanent records upon exposure to temperatures above a predetermined level, thermal writing means including heat-concentrating stylus means, means for moving the thermal writing means and record medium relative to one another in a heat-exchanging relationship, said heat-concentrating stylus means for said thermal writing means comprising a pair of elements of dissimilar materials which exhibit a Peltier effect when current is forced through a junction thereof, means connecting said elements in series to form a single thermoelectric junction therebetween at the locus of a writing surface of said stylus means, and means for continuously forcing unidirectional current through said elements and said junction in the one of two possible current directions which develops predominantly heat-emitting effects and temperatures above said predetermined level said junction simultaneously with operation of said means for moving the thermal writing means and record medium relative to one another in said heat-exchanging relationship.

5. In a recorder or the like of the type having a thermally-responsive record medium which produces visible records upon exposure to temperatures above a predetermined level, thermal writing means, and means for moving the thermal writing means and record medium relative to one another in a contacting relationship, a heat-concentrating stylus arrangement for said thermal writing means comprising a pair of dissimilar-metal wires, a single weld between said wires forming a thermoelectric junction therebetween connecting said wires in series, said joined wires having a substantially V-shaped configuration with said junction substantially at the tip thereof, and means for continuously forcing unidirectional current through said wires and said junction in the direction which develops predominantly heat-emitting effects and temperatures above said predetermined level at said junction simultaneously with operation of said means for moving the thermal writing means and record medium relative to one another in said contacting relationship, whereby heat generated by the substantially V-shaped stylus is concentrated substantially at the tip thereof.

6. Heat-generating stylus apparatus or the like comprising a pair of dissimilar-material wire-like elements crossed and contacting at an angle of inclination to one another at substantially one point to form a substantially V-shaped unit, a single spot weld of relatively small area forming a thermoelectric junction substantially at said point of contact, the tip of said unit being rounded to form a writing point wherein the thermoelectric junction material of said weld comprises at least part of the exposed surfaces at said rounded tip, and means for connecting said elements in series with a source of unidirectional current to conduct current through said junction in the direction which develops predominantly heat-emitting effects at said junction.

References Cited
UNITED STATES PATENTS

| | | | |
|---|---|---|---|
| 2,739,030 | 3/1956 | Kruse | 346—76 |
| 2,957,315 | 10/1960 | Wood | 346—76 X |

RICHARD B. WILKINSON, *Primary Examiner.*

J. W. HARTARY, *Assistant Examiner.*